United States Patent
Kang et al.

(10) Patent No.: US 12,062,164 B2
(45) Date of Patent: Aug. 13, 2024

(54) PATTERN ANALYSIS SYSTEM AND METHOD OF MANUFACTURING SEMICONDUCTOR DEVICE USING THE SAME

(71) Applicant: SAMSUNG ELECTRONICS CO., LTD., Suwon-si (KR)

(72) Inventors: Min-Cheol Kang, Hwaseong-si (KR); Dong Hoon Kuk, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 143 days.

(21) Appl. No.: 17/547,503

(22) Filed: Dec. 10, 2021

(65) Prior Publication Data
US 2022/0207699 A1   Jun. 30, 2022

(30) Foreign Application Priority Data
Dec. 30, 2020   (KR) .................. 10-2020-0187014

(51) Int. Cl.
G06T 7/00   (2017.01)
G06T 5/70   (2024.01)
G06T 7/13   (2017.01)
G06T 7/30   (2017.01)

(52) U.S. Cl.
CPC .............. G06T 7/0004 (2013.01); G06T 5/70 (2024.01); G06T 7/13 (2017.01); G06T 7/30 (2017.01); *G06T 2207/10061* (2013.01)

(58) Field of Classification Search
CPC ......... G06T 7/0004; G06T 5/002; G06T 7/13; G06T 7/30; G06T 2207/10061; G06T 2207/20221; G06T 2207/30148; G06T 7/174; G06T 7/194; G01N 2021/8887
See application file for complete search history.

(56) References Cited

U.S. PATENT DOCUMENTS

| | | | |
|---|---|---|---|
| 7,235,782 B2 | 6/2007 | Takane et al. | |
| 8,655,050 B2 | 2/2014 | Toyoda et al. | |
| 8,946,630 B2 | 2/2015 | Gabrani et al. | |
| 8,972,911 B2 | 3/2015 | Matsuoka et al. | |
| 9,793,183 B1* | 10/2017 | Ho | G03F 7/70633 |
| 10,416,087 B2 | 9/2019 | Zhang et al. | |
| 10,529,534 B2 | 1/2020 | Sriraman | |
| 10,535,129 B2 | 1/2020 | Kitazawa et al. | |
| 10,754,256 B2 | 8/2020 | Wallow et al. | |

(Continued)

FOREIGN PATENT DOCUMENTS

JP   2008-083926   4/2008

*Primary Examiner* — Oneal R Mistry
*Assistant Examiner* — Vaisali Rao Koppolu
(74) *Attorney, Agent, or Firm* — F. CHAU & ASSOCIATES, LLC

(57) ABSTRACT

A method of manufacturing a semiconductor device that includes providing a substrate having a pattern formed thereon. A scanning electron microscope (SEM) image is generated that includes a boundary image showing an edge of the pattern. A blended image is generated by performing at least one blending operation on the SEM image and a background image aligned with the boundary image. Contour data is generated by binarizing the blended image on a basis of a threshold value. The threshold value is determined by a critical dimension of the pattern.

19 Claims, 19 Drawing Sheets

(56) References Cited

U.S. PATENT DOCUMENTS

| | | | | |
|---|---|---|---|---|
| 2008/0319696 | A1* | 12/2008 | Tanaka | H01J 37/222 |
| | | | | 702/97 |
| 2013/0315468 | A1* | 11/2013 | Toyoda | G01R 31/31813 |
| | | | | 382/147 |
| 2013/0321610 | A1* | 12/2013 | Momonoi | H04N 7/18 |
| | | | | 348/80 |
| 2014/0023265 | A1* | 1/2014 | Kitazawa | G06T 7/0004 |
| | | | | 382/151 |
| 2016/0203945 | A1* | 7/2016 | Foucher | H01J 37/265 |
| | | | | 250/252.1 |
| 2017/0336717 | A1* | 11/2017 | Shinoda | G03F 7/705 |
| 2018/0275521 | A1* | 9/2018 | Wallow | G03F 7/7065 |
| 2020/0074611 | A1* | 3/2020 | Dou | G06T 7/001 |
| 2020/0265573 | A1* | 8/2020 | Tsai | G06T 7/001 |

\* cited by examiner

PATTERN ANALYSIS SYSTEM AND METHOD OF MANUFACTURING SEMICONDUCTOR DEVICE USING THE SAME

This application claims priority under 35 U.S.C. § 119 to Korean Patent Application No. 10-2020-0187014, filed on Dec. 30, 2020 in the Korean Intellectual Property Office, the disclosure of which is incorporated by reference in its entirety herein.

1. TECHNICAL FIELD

The present inventive concepts relate to a pattern analysis system and a method of manufacturing a semiconductor device using the same.

2. DISCUSSION OF RELATED ART

In manufacturing a semiconductor device, precise measurements of fine patterns formed through a photolithography process, an etching process, and the like may be performed. To check whether fine patterns are formed with precise dimensions before and after a patterning process, an electrical characteristic test is performed, or a critical dimension and the like of the fine patterns are measured.

For example, a scanning electron microscope (SEM) may be used to measure critical dimension of the fine patterns. Here, a critical dimension is a specified value for a spatial limit between interconnected lines of a semiconductor device and a width of the lines, such as the minimum space or the minimum circuit line width between two lines.

However, for a highly fine pattern formed through an extreme ultraviolet (EUV) patterning technology, using only critical dimensions makes it difficult to correct errors occurring in overlay and optical proximity correction (OPC) and the discrepancy between critical dimensions results in the degradation of the accuracy in measuring a two-dimensional pattern.

SUMMARY

Aspects of the present inventive concepts provide a pattern analysis system for generating edge placement (EP) data through a scanning electron microscope (SEM) image whose contrast quality is degraded.

Aspects of the present inventive concepts also provide a method of manufacturing a semiconductor device which generates EP data through an SEM image whose contrast quality is degraded.

It should be noted that objects of the present inventive concepts are not limited to the above-described objects, and other objects which have not been mentioned will be apparent to those skilled in the art from the following descriptions.

According to an embodiment of the present inventive concepts, a method of manufacturing a semiconductor device includes providing a substrate having a pattern formed thereon. A scanning electron microscope (SEM) image is generated that includes a boundary image showing an edge of the pattern. A blended image is generated by performing at least one blending operation on the SEM image and a background image aligned with the boundary image. Contour data is generated by binarizing the blended image on a basis of a threshold value. The threshold value is determined by a critical dimension of the pattern.

According to an embodiment of the present inventive concepts, a method of manufacturing a semiconductor device includes providing a substrate having a pattern formed thereon. A scanning electron microscope (SEM) image is generated that includes a boundary image showing an edge of the pattern. A blended image is generated by performing at least one blending operation on the SEM image and a background image aligned with the boundary image. The generating of the blended image includes generating a first blended image by performing a first blending operation on the SEM image and a first background image aligned with the boundary image. A second blended image is generated by performing a second blending operation on the SEM image and a second background image that is generated on a basis of the first blended image depending on whether a predetermined condition is satisfied. Contour data is generated by binarizing the blended image.

According to an embodiment of the present inventive concepts, a pattern analysis system includes an observing apparatus configured to generate a scanning electron microscope (SEM) image of a substrate having a pattern formed thereon. The SEM image includes a boundary image showing an edge of the pattern. An image module is configured to provide a background image aligned with the SEM image based on the boundary image. A blending module is configured to receive the background image and the SEM image and generate a blended image by performing a blending operation on the background image and the SEM image. An edge placement (EP) gauge module is configured to generate contour data by binarizing the blended image on a basis of a threshold value. The threshold value is determined by a critical dimension (CD) of the pattern.

BRIEF DESCRIPTION OF THE DRAWINGS

The above and other aspects and features of the present inventive concepts will become more apparent by describing embodiments thereof in detail with reference to the attached drawings, in which.

DETAILED DESCRIPTION OF EMBODIMENTS

Figure 1:
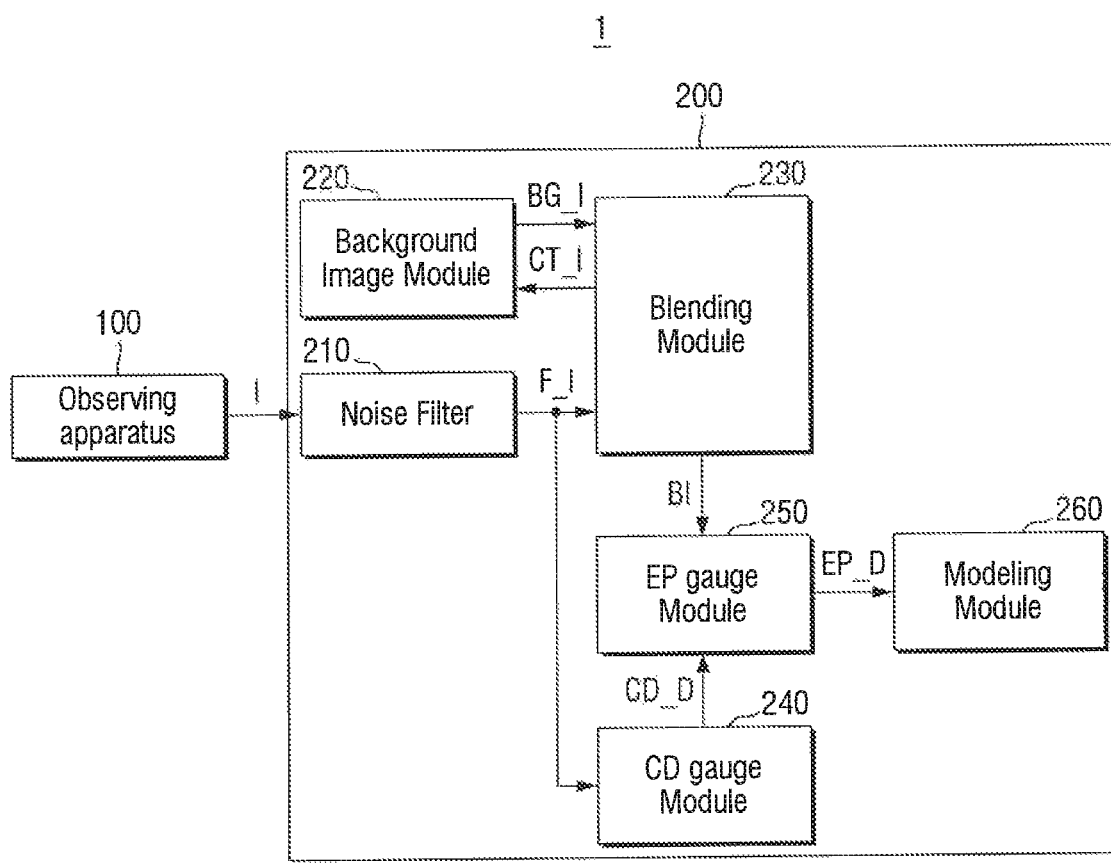
FIG. 1 is a block diagram illustrating a pattern analysis system according to an embodiment of the present inventive concepts.

Hereinafter, embodiments according to the technical spirit of the present inventive concepts will be described with reference to the accompanying drawings. In the descriptions of FIGS. 1 to 18, substantially the same elements are denoted by the same reference numerals, and overlapping descriptions of the elements will be omitted for convenience of explanation. Throughout several drawings of the present inventive concepts, like reference numerals are used for like elements.

Figure 2:
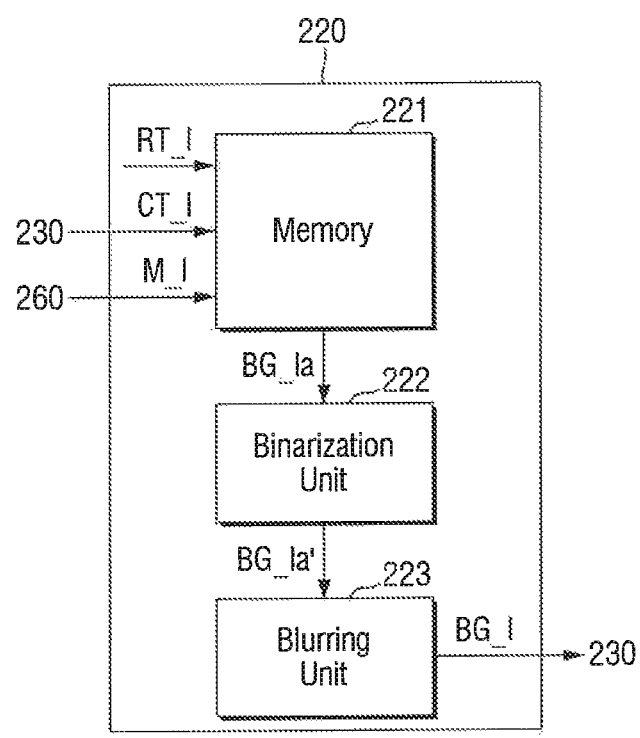
FIG. 2 is a block diagram illustrating a background image module according to an embodiment of the present inventive concepts.

FIG. 1 is a block diagram illustrating a pattern analysis system according to an embodiment of the present inventive concepts. FIG. 2 is a block diagram illustrating a background image module according to an embodiment of the present inventive concepts.

Referring to the embodiments of FIGS. 1 and 2, a pattern analysis system 1 may include an observing apparatus 100 and an analysis apparatus 200.

The observing apparatus 100 may image a substrate on which a pattern is formed. The observing apparatus 100 according to an embodiment of the present inventive concepts may image a semiconductor substrate or an etched semiconductor substrate. In an embodiment, an image I of a semiconductor substrate captured by the observing apparatus 100 may be a scanning electron microscope (SEM) image or an intensity map image, and for convenience of description, the image I of the semiconductor substrate is referred to as an SEM image I. However, embodiments according to the technical spirit of the present inventive concepts are not limited thereto.

The resolution of the SEM image I is within a range. The observing apparatus 100 according to some embodiments may include an electron gun to capture the SEM image I. The electron gun may be implemented as a thermionic electron gun, a field emission electron gun, or the like. However, embodiments of the present inventive concepts are not limited thereto.

In an embodiment, the resolution of the SEM image I may be in a range of about 2 nm to about 10 nm. In an embodiment, when a critical dimension or a pitch of a plurality of patterns deviating from the above range is imaged, images of the patterns may be distorted.

As shown in the embodiment of FIG. 1, the analysis apparatus 200 may include a noise filter 210, a background image module 220, a blending module 230, a critical dimension (CD) gauge module 240, an edge placement (EP) gauge module 250, and a modeling module 260.

The noise filter 210 receives the SEM image I from the observing apparatus 100 and performs a noise filtering operation to generate a filtered image F_I from which noise is removed. In an embodiment, the noise filtering operation may include at least one operation selected from Gaussian noise filtering, median kernel noise filtering, and the like. However, embodiments of the present inventive concepts are not limited thereto. For example, high-frequency noise included in the SEM image I is removed by convolving a Gaussian kernel, a median kernel, or the like on the SEM image I, and the filtered image F_I is provided to the blending module 230 and the CD gauge module 240.

As shown in the embodiment of FIG. 2, the background image module 220 is a module which provides a background image BG_I to the blending module 230 and may include a memory 221, a binarization unit 222, and a blurring unit 223.

The memory 221 may store a pre-background image BG_Ia which is the basis of the background image BG_I. In an embodiment, the memory 221 may store a round target image RT_I, a contour image CT_I provided by the blending module 230, and a model image M_I provided by the modeling module 260 as the pre-background image BG_Ia.

In an embodiment, the stored round target image RT_I, contour image CT_I, and model image M_I may be binarized images, and some pre-background images BG_Ia may be grayscale images. However, embodiments of the present inventive concepts are not limited thereto.

In an embodiment, the binarization unit 222 may convert the pre-background image BG_Ia provided through the memory 221 into a contour image BG_Ia' by binarizing the pre-background image BG_Ia.

In an embodiment, the blurring unit 223 may generate the background image BG_I by performing a Gaussian blur on the contour image BG_Ia'. The blurring unit 223 may provide the background image BG_I to the blending module 230. In an embodiment, the Gaussian blur may be performed thereafter as a filtering operation to reduce information loss of a white band WB (see FIG. 7) of the SEM image I in a blending operation.

As shown in the embodiment of FIG. 1, the blending module 230 may receive the background image BG_I from the background image module 220, receive the filtered image F_I from the noise filter 210, generate a blended image BI by performing a blending operation on the background image BG_I and the filtered image F_I, and provide the blended image BI to the EP gauge module 250. However, embodiments of the present inventive concepts are not limited thereto.

In an embodiment, the blending module 230 may provide the contour image CT_I obtained by binarizing the blended image BI to the background image module 220, and then the blending module 230 receives the blended image BI processed by the background image module 220 based on the contour image CT_I as a background image BG_I from the background image module 220 and performs a blending operation on the blended image BI and the background image BG_I.

The blending module 230 may control the number of repetitions of blending according to whether a predetermined condition is satisfied. In an embodiment, the number of repetitions of blending may be controlled according to a slope comparison in the line profile of the blended image BI or the number of repetitions of blending already performed.

The CD gauge module 240 may generate critical dimension data CD_D by receiving the filtered image F_I and provide the generated critical dimension data CD_D to the EP gauge module 250.

In an embodiment, the EP gauge module 250 may perform a binarization operation on the basis of the blended image BI received from the blending module 230 and the critical dimension data CD_D received from the CD gauge module 240, generate contour data EP_D of patterns captured in the SEM image I, and provide the contour data EP_D to the modeling module 260.

In an embodiment, the modeling module 260 may receive a plurality of pieces of contour data EP_D and perform optical proximity correction (OPC) modeling on the basis of the plurality of pieces of contour data EP_D. Also, the modeling module 260 may perform dispersion analysis on OPC modeling by extracting contour data EP_D of various SEM images I of the same pattern and verify the OPC modeling of the pattern through OPC simulation contour and EP error analysis. Also, as shown in the embodiment of FIG. 2, the modeling module 260 may provide the model image M_I as a result of verifying the OPC modeling to the background image module 220.

Subsequently, mask tape-out (MTO) design data may be generated from the OPC modeling result, and a mask may be generated from the MTO design data.

Figure 3:
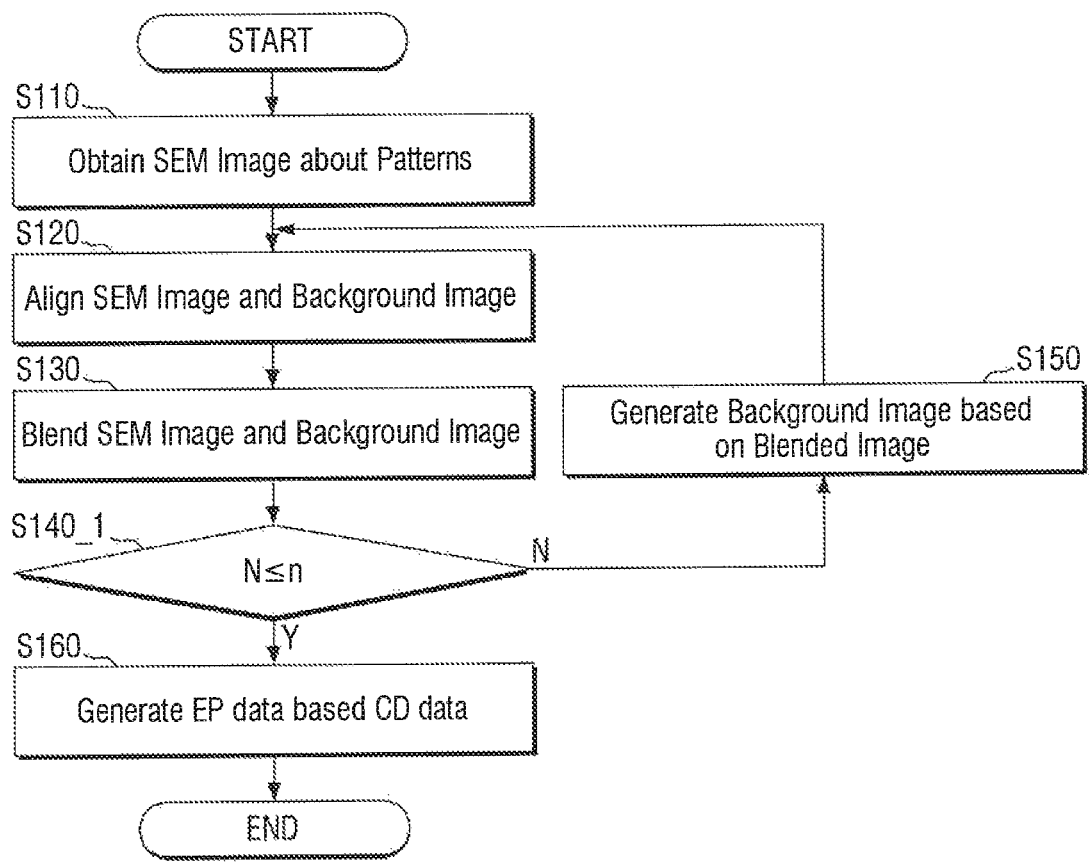
FIG. 3 is a flowchart illustrating a method of manufacturing a semiconductor device according to an embodiment of the present inventive concepts.
Figure 4:
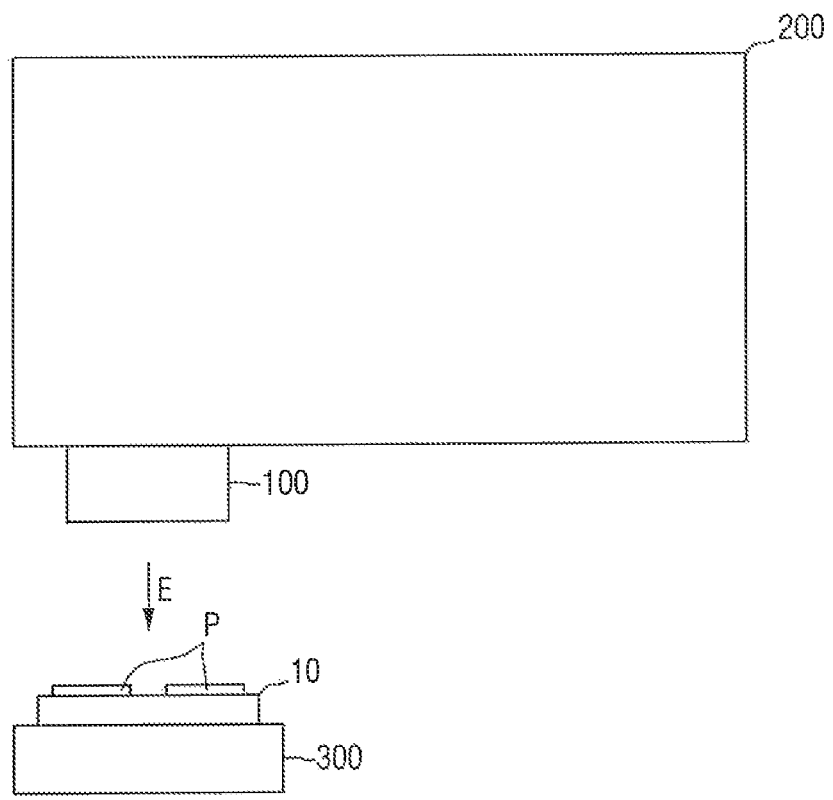
FIGS. 4 and 5 are diagrams illustrating a pattern which is the target of measurement of the pattern analysis system according to an embodiment of the present inventive concepts.
Figure 5:
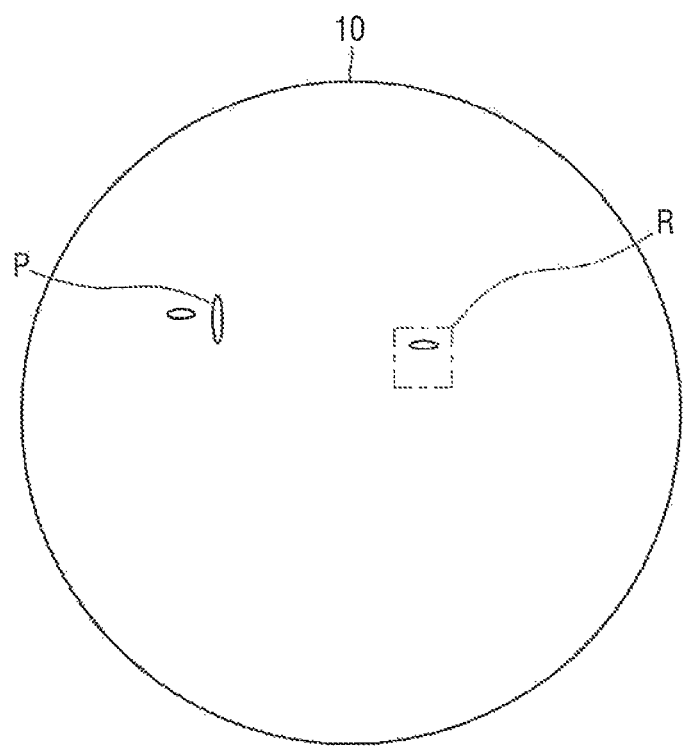
Figure 6:
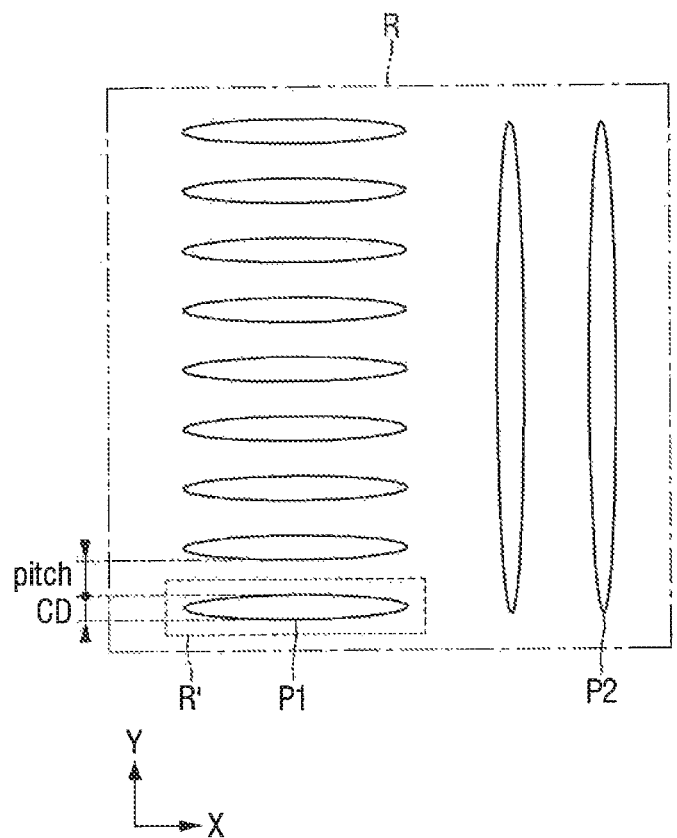
FIG. 6 is an enlarged view of region R of FIG. 5 according to an embodiment of the present inventive concepts.
Figure 7:
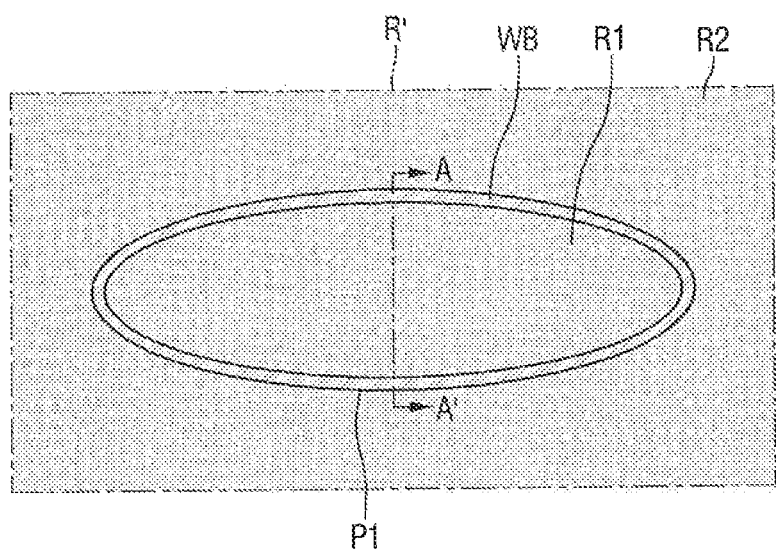
FIG. 7 is a diagram showing a scanning electron microscope (SEM) image of region R' of FIG. 6 according to an embodiment of the present inventive concepts.

FIG. 3 is a flowchart illustrating a method of manufacturing a semiconductor device according to an embodiment of the present inventive concepts. FIGS. 4 and 5 are diagrams illustrating a pattern which is the target of measurement of the pattern analysis system according to an embodiment of the present inventive concepts. FIG. 6 is an enlarged view of region R of FIG. 5. FIG. 7 is a diagram showing an SEM image of region R' of FIG. 6.

Referring to the embodiments of FIGS. 3 to 7, the observing apparatus 100 may emit electron beams E to a semiconductor substrate 10 having a pattern P formed thereon, on a stage 300 to image the pattern P. Accordingly, as shown in block S110 of FIG. 3, the observing apparatus 100 acquires an SEM image I of the pattern P.

The observing apparatus 100 provides the acquired SEM image I to the analysis apparatus 200.

In an embodiment, the pattern P on the semiconductor substrate 10 may be a photoresist (PR) pattern, and thus the SEM image I may be an after development inspection (ADI) image. However, embodiments of the present inventive concepts are not limited thereto. In an embodiment, polymethylmethacrylate (PMMA), poly(4-hydroxystyrene), and the like may be used in a PR formed by extreme ultraviolet (EUV) light. However, embodiments of the present inventive concepts are not limited thereto. Also, a PR pattern formed by EUV light may have a thickness in a range of about 50 nm to about 80 nm. This thickness range may prevent defects in the PR pattern.

However, embodiments of the present inventive concepts are not limited thereto. For example, in an embodiment, the pattern P on the semiconductor substrate 10 may be a wafer pattern formed by a PR pattern, and thus the SEM image I may be an after cleaning inspection (ACI) image. The technical spirit of the present inventive concepts is not limited to the image examples, and in some embodiments the SEM image I may be an image based on an optical model, etc.

As shown in the embodiment of FIG. 6, the pattern P may include first patterns P1 and second patterns P2 on the semiconductor substrate 10. In an embodiment, the first patterns P1 may extend in a first direction parallel to the x-axis (hereinafter, the "X direction"), and the second patterns P2 may extend in a second direction parallel to the y-axis (hereinafter, the "Y direction") which crosses the first direction x. While the embodiment of FIG. 6 shows the X direction and the Y direction are perpendicular to each other, embodiments of the present inventive concepts are not limited thereto and the X direction may cross the Y direction at various different angles.

In an embodiment, the pattern P may be formed by an EUV patterning technology. Accordingly, for example, the critical dimension of the first patterns P1 in the Y direction may be in a range of about 3 nm to about 4 nm, and the pitch between the first patterns P1 may also be in the range of about 3 nm to about 4 nm. In addition, rounded corners of the edge of each of the first patterns P1 and the second patterns P2 have a radius in a range of about 70 nm to about 170 nm. The shapes and arrangements of the first and second patterns P1, P2 may vary and are not limited to the shapes and arrangements of the embodiments shown in FIG. 6. Additionally the number of the patterns included in the pattern P may vary.

EUV light used for patterning may have a wavelength in a range of about 4 nm to about 124 nm. For example, the wavelength of the EUV light used for patterning may be in a range of about 4 nm to about 20 nm. However, embodiments of the present inventive concepts are not limited thereto. In an embodiment, the EUV light may be generated by applying laser light to a plasma source material (e.g., TiN).

Accordingly, when the pattern P formed by the EUV light is imaged through an SEM imaging method having a resolution of about 2 nm to about 10 nm, an SEM image I may be acquired that has a partial region that is distorted or has a contrast that is degraded.

Figure 9A:
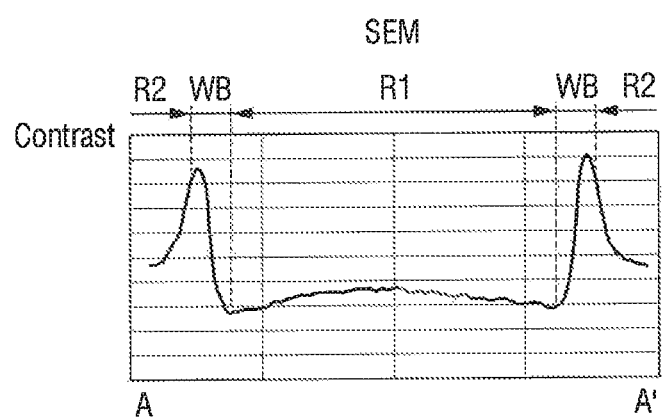
FIG. 9A is a graph showing the contrast of the image of FIG. 7 measured along line A-A' according to an embodiment of the present inventive concepts.

FIG. 9A is a graph showing the contrast of the image of FIG. 7 measured along line A-A'.

Referring to the embodiments of FIGS. 7 and 9A further, the SEM image I of the first pattern P1 may include a first region R1, a second region R2, and the white band WB.

As shown in the embodiment of FIG. 7, the white band WB may be disposed between the first region R1 and the second region R2 and may separate the first region R1 and the second region R2. The white band WB is a section having a higher contrast value than the first region R1 and the second region R2 and corresponds to a boundary image showing the edge of the pattern P. The contour of the pattern P may be determined by the white band WB.

Although varying depending on embodiments, the first region R1 and the second region R2 may correspond to any one of polygon regions and space regions. However, there is not a large difference in contrast value between the first region R1 and the second region R2, and thus it may be difficult to distinguish between polygon regions/space regions through the contrast values.

As shown in the embodiment of FIG. 3, the blending module 230 receives the background image BG_I from the background image module 220, receives the filtered image F_I of the SEM image I from the noise filter 210, and aligns the two images with each other in block S120.

Figure 8:
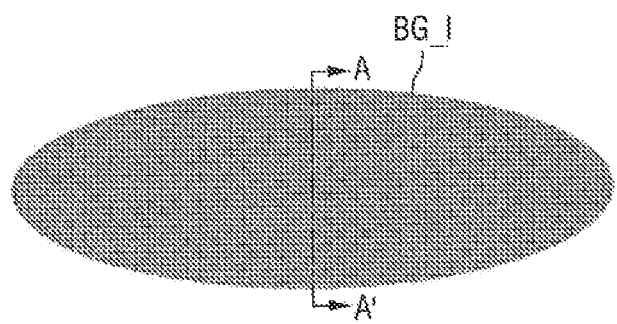
FIG. 8 is a diagram showing a background image corresponding to the SEM image of FIG. 7 according to an embodiment of the present inventive concepts.
Figure 9B:
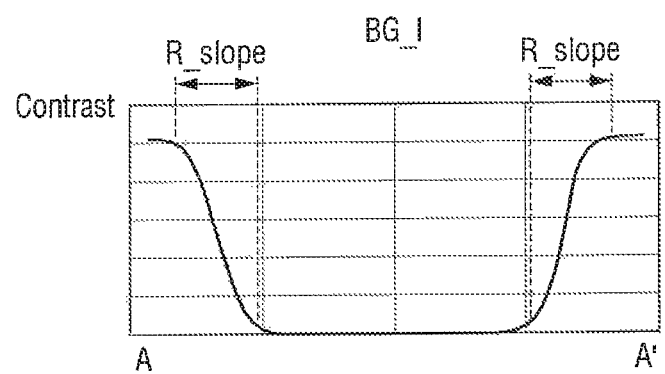
FIG. 9B is a graph showing the contrast of the image of FIG. 8 measured along line A-A' according to an embodiment of the present inventive concepts.

FIG. 8 is a diagram showing a background image corresponding to the SEM image of FIG. 7. FIG. 9B is a graph showing the contrast of the image of FIG. 8 measured along line A-A'.

Referring to the embodiments of FIGS. 2, 7, 8 and 9B, the background image BG_I is an image obtained by blurring the binarized contour image BG_Ia' through the blurring unit 223, and thus slope sections R_slope in which a contrast value changes within the slope section may be included.

The slope sections R_slope may correspond to the white band WB of the SEM image I, and the background image BG_I and the filtered image F_I of the SEM image I are aligned with each other on the basis of the slope section R_slope and the white band WB.

In an embodiment, in block S130 shown in FIG. 3, the blending module 230 may blend the aligned images together as shown in Equation 1 below.

$$BI(P) = \alpha \times F(P) + (1-\alpha) \times BG(P) \qquad \text{<Equation 1>}$$

P denotes a position in an image, BI denotes a blending result value, F denotes a contrast value of the filtered image F_I of the SEM image I, BG denotes a contrast value of the background image BG_I, and α has a value in a range of 0 to 1.

In an embodiment, the blending module 230 may perform a blending operation using an alpha blending method as shown in Equation 1 above. However, embodiments of the present inventive concepts are not limited thereto and the blending method may vary.

Figure 10:
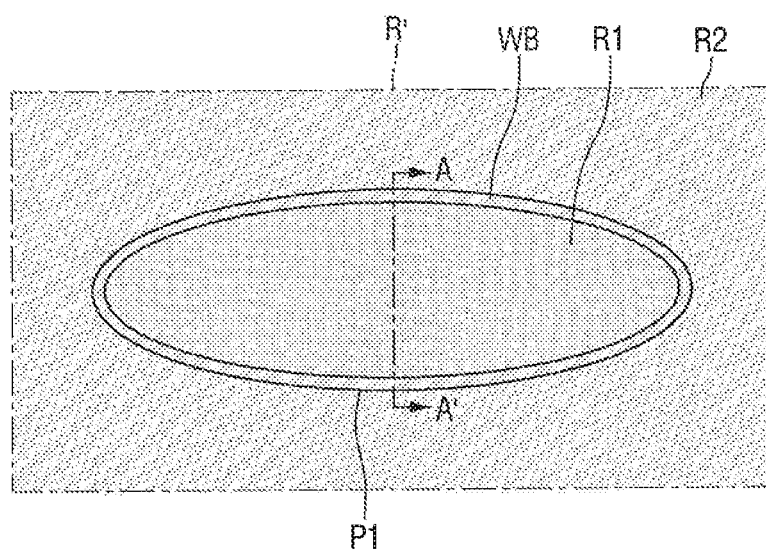
FIGS. 10 and 11 are diagrams illustrating the method of manufacturing a semiconductor device according to embodiments of the present inventive concepts.
Figure 11:
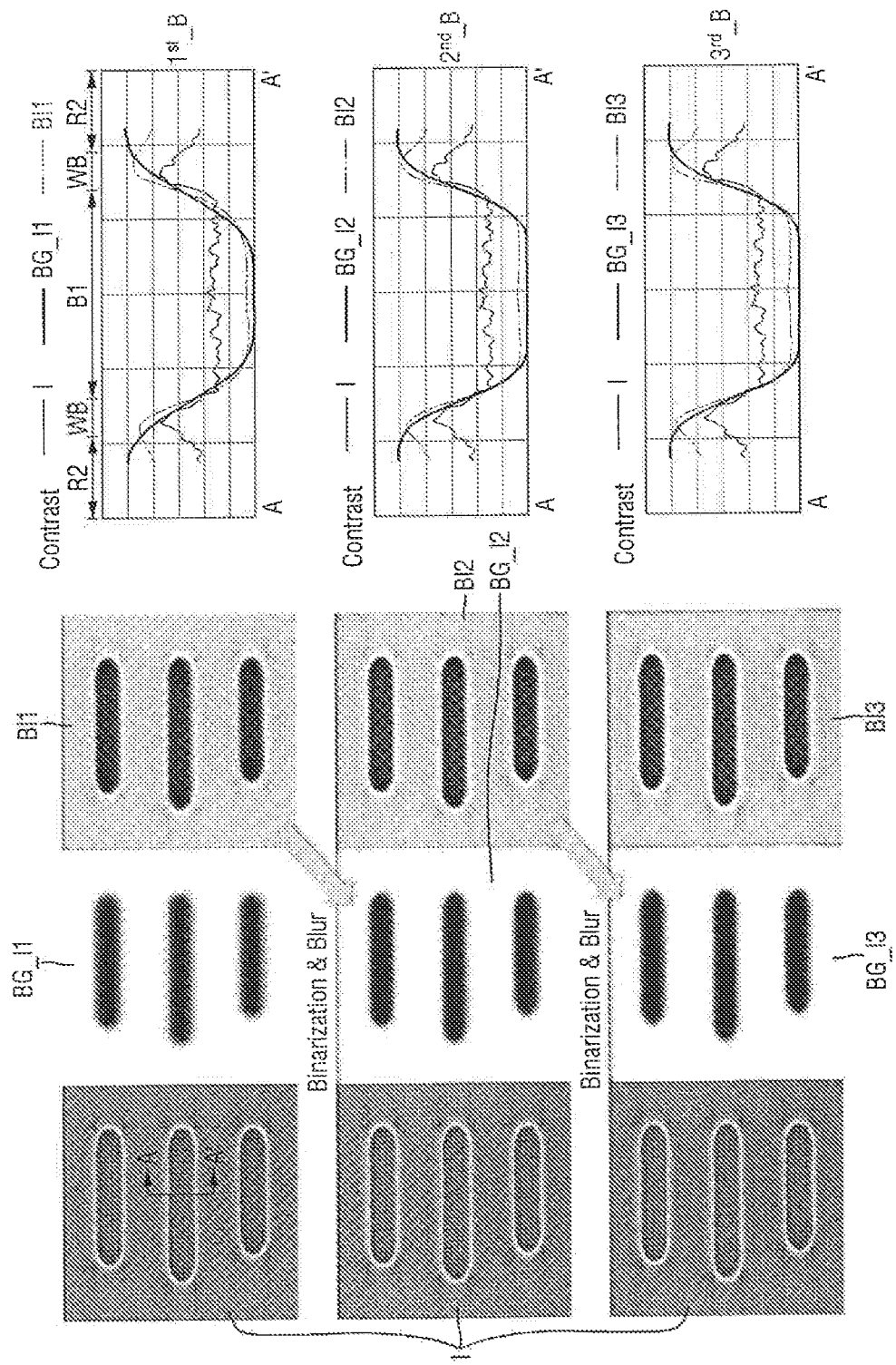

FIGS. 10 and 11 are diagrams illustrating the method of manufacturing a semiconductor device according to some embodiments of the present inventive concepts. FIG. 10 is a diagram showing a blended image of the first pattern P1 according to a blending operation of the blending module 230.

As shown in the embodiment of FIG. 3, in block S140_1, the blending module 230 may determine whether to repeat a blending operation by comparing a blending operation number n of the filtered image F_I of the SEM image I with a predetermined number N (N is a natural number greater than or equal to 1). For convenience of description, N is assumed to be 3. However, embodiments of the present inventive concepts are not limited thereto and N may be any natural number greater than or equal to 1.

As shown in the embodiment of FIG. 11, the blending module 230 may generate a first blended image BI1 by performing a first blending operation 1st_B on a first background image BG_I1 and the SEM image I, such as the filtered image F_I.

Since the blending operation number is 1 (N), the blending module 230 provides the first blended image BI1 to the background image module 220, and the background image module 220 generates a second background image BG_I2 on the basis of the first blended image BI1 in block S150.

In an embodiment, the background image module 220 may generate the second background image BG_I2 by binarizing and blurring the first blended image BI1 through the binarization unit 222 and the blurring unit 223.

It is self-evident that the operations in blocks S120 and S130 are performed on the filtered image F_I of the SEM image I and the second background image BG_I2 as described above with reference to the first blending operation 1st_B and a repeated description will be omitted for convenience of explanation.

The blending module 230 may generate a second blended image BI2 by performing a second blending operation 2nd_B.

As shown in the embodiment of FIG. 11, since the blending operation number is 2 (N), the blending module 230 provides the second blended image BI2 to the background image module 220, and the background image module 220 generates a third background image BG_I3 on the basis of the second blended image BI2 in block S150.

The background image module 220 may generate the third background image BG_I3 by binarizing and blurring the second blended image BI2 through the binarization unit 222 and the blurring unit 223.

It is self-evident that the operations in blocks S120 and S130 are performed on the filtered image F_I of the SEM image I and the third background image BG_I3 as described above with reference to the first blending operation 1st_B and a repeated description will be omitted for convenience of explanation.

The blending module 230 may generate a third blended image BI3 by performing a third blending operation 3rd_B.

In an embodiment, since the blending operation number is 3 (Y), the blending module 230 may provide the blended image BI to the EP gauge module 250 in the form of the third blended image BI3.

When the first to third blended images BI1 to BI3 generated through the first to third blending operations 1st_B to 3rd_B are compared with each other, a contrast slope of the third blended image BI3 in the white band WB section has a greater similarity to a contrast slope of the filtered image F_I of the SEM image I in the white band WB section than a contrast slope of the first blended image BI1 to the contrast slope of the filtered image F_I of the SEM image I.

Further, in the white band WB section, a contrast value of the third blended image BI3 is larger than a contrast value of the first blended image BI1 such that a contour can be easily formed.

For example, when the number of blending operations being performed increases, data of the blended image BI in the white band WB section becomes similar to data of the filtered image F_I in the white band WB section, and contrast values of the first region R1 and the second region R2 are clearly distinguished from each other.

Figure 12:
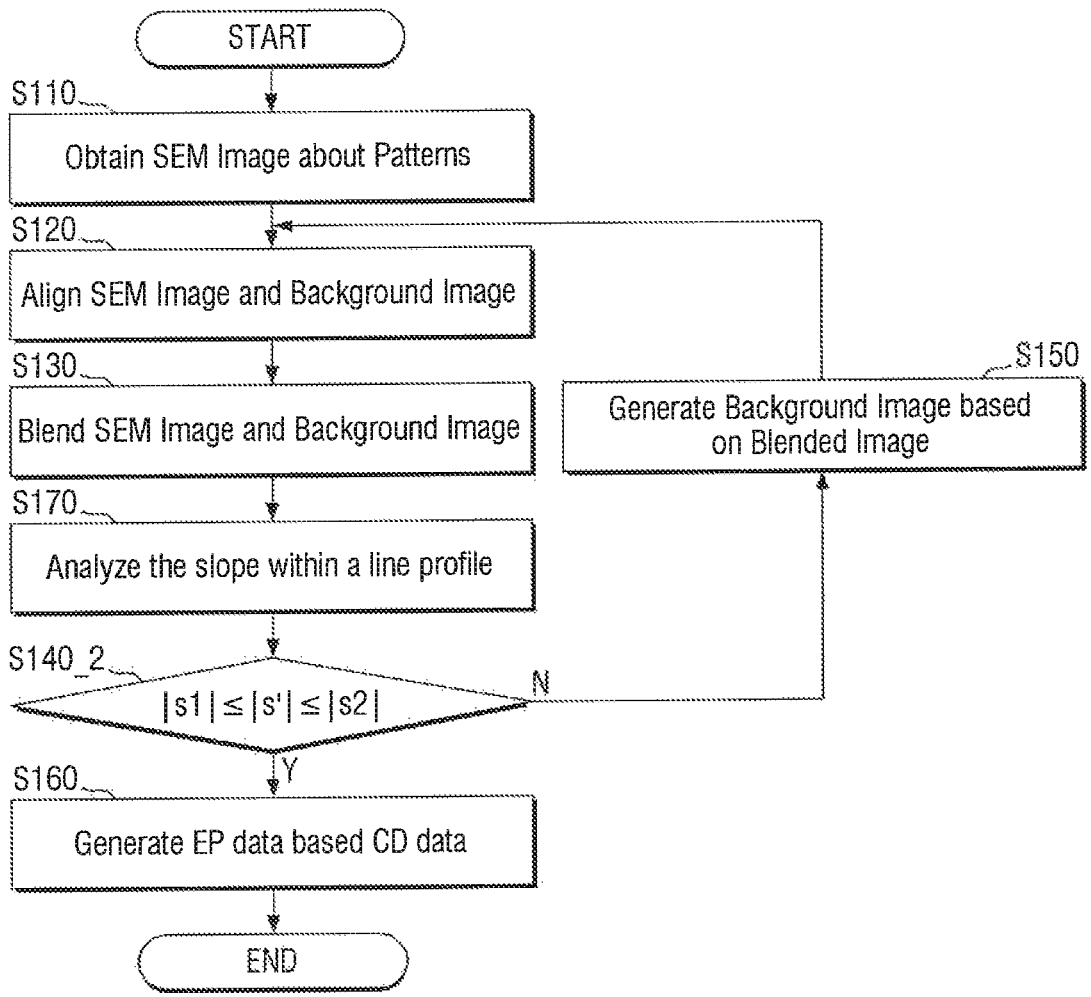
FIGS. 12 and 13 are a flowchart and a graph illustrating a method of manufacturing a semiconductor device according to embodiments of the present inventive concepts.
Figure 13:
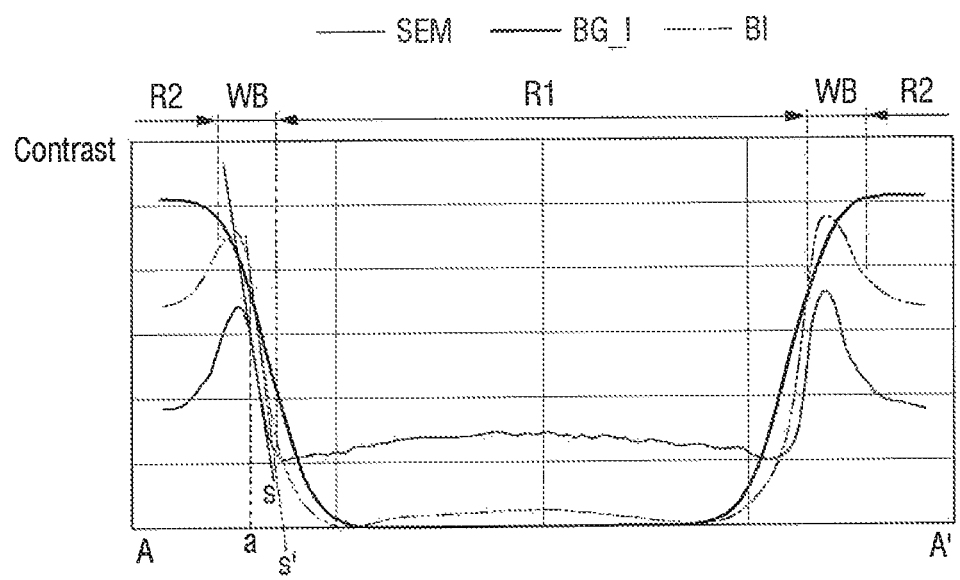
Figure 14:
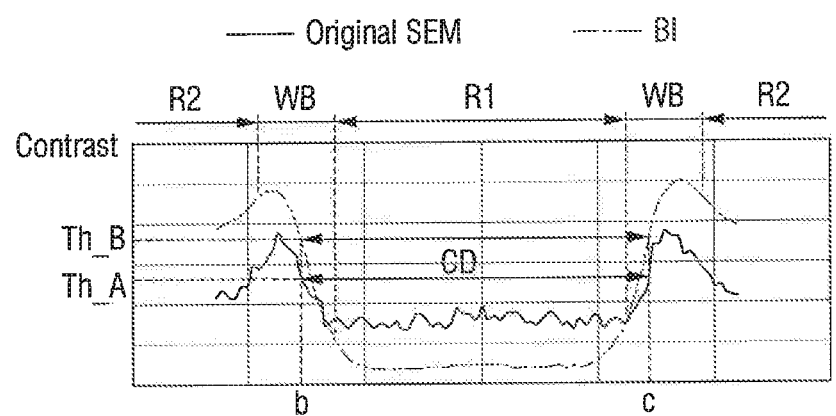
FIGS. 14 to 17 are diagrams illustrating the method of manufacturing a semiconductor device according to embodiments of the present inventive concepts.
Figure 15:
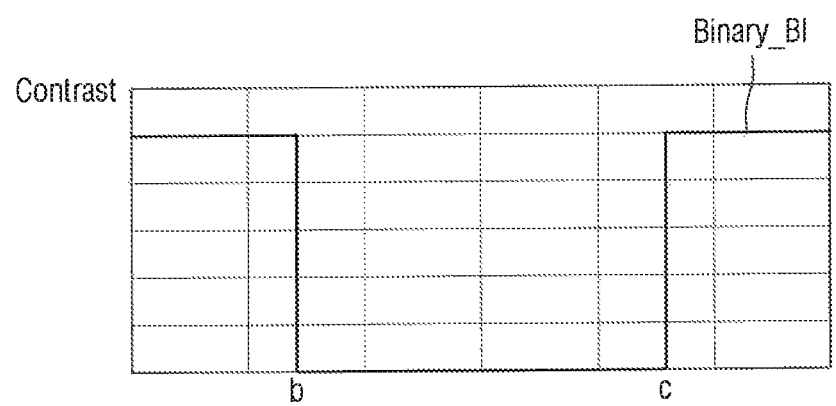
Figure 16:
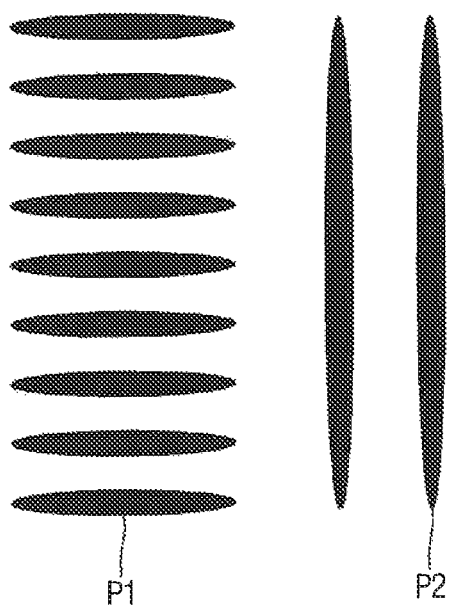

FIGS. 12 and 13 are a flowchart and a graph illustrating a method of manufacturing a semiconductor device according to some embodiments of the present inventive concepts.

The method of manufacturing a semiconductor device according to some embodiments of the present inventive concepts will be described below with reference to FIGS. 12 and 13. S140_2, which is different from S1401 illustrated in the embodiment of FIG. 3, will be mainly described.

In the method of manufacturing a semiconductor device according to some embodiments, a slope s' in a line profile of a blended image BI is analyzed in block S170 after the blending operation is performed in block S130.

The blending module 230 measures the contrast slope s' of the blended image BI at a first point a included in a white band WB section. Also, the blending module 230 measures a contrast slope s of a filtered image F_I of an SEM image I at the same first point a.

In block S140_2, first and second slope coefficients s1 and s2 may be generated on the basis of the contrast slope s of the filtering image F_I, and the slope s' may be compared with the first and second slope coefficient s1 and s2 to determine whether to repeat a blending operation.

For example, in an embodiment the first slope coefficient s1 may be about 0.99 s, and the second slope coefficient s2 may be about 1.01 s. When Equation 2 below is satisfied, the blending module 230 may provide the blended image BI to the EP gauge module 250.

$$|0.99s|=|s1|\leq|s'|\leq|s2|=|1.01s|  \qquad <\text{Equation 2}>$$

However, Equation 2 is an example for a comparison between the contrast slope s' of the blended image BI and the contrast slope s of the filtered image F_I, and Equation 2 does not limit the technical spirit of the present inventive concepts. For example, the comparison between the contrast slope s' of the blended image BI and the contrast slope s of the filtered image F_I may be performed by various different methods and may have various different predetermined conditions that must be satisfied for the blending module 230 to provide the blended image BI to the EP gauge module 250.

FIGS. 14 to 17 are diagrams illustrating the method of manufacturing a semiconductor device according to some embodiments of the present inventive concepts.

Referring to the embodiments of FIGS. 14 to 17, the CD gauge module 240 may measure a critical dimension CD on the basis of a threshold contrast value Th_A of a second point b and a third point c of the SEM image, such as the filtered image F_I and provide critical dimension data CD_D including the critical dimension CD between the second point b and the third point c to the EP gauge module 250.

In an embodiment, the EP gauge module 250 may receive a blended image BI and the critical dimension data CD_D and determine a threshold contrast value Th_B on the basis of the critical dimension CD between the second point b and the third point c.

In an embodiment, the EP gauge module 250 generates a binary blended image Binary_BI by binarizing the blended image BI on the basis of the threshold contrast value Th_B of the blended image BI and generates contour data EP_D of the binary blended image Binary_BI. The contour data EP_D may include coordinate information of an edge point Pa of the blended image Binary_BI.

Figure 18:
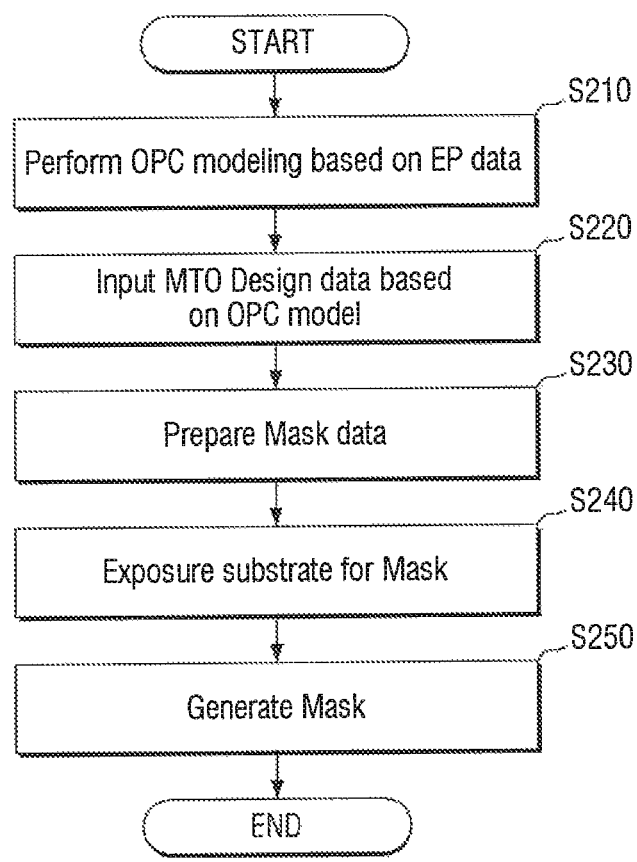
FIG. 18 is a flowchart illustrating the method of manufacturing a semiconductor device according to an embodiment of the present inventive concepts.

FIG. 18 is a flowchart illustrating the method of manufacturing a semiconductor device according to an embodiment of the present inventive concepts.

Figure 17:
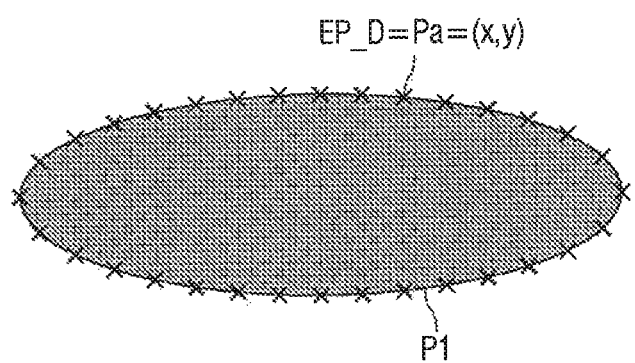

The EP gauge module 250 may provide the contour data EP_D, which is a measurement result, to the modeling module 260, and in block S210 the modeling module 260 performs OPC modeling on the basis of a plurality of pieces of contour data EP_D (FIG. 17).

In block S220, after OPC modeling is performed, MTO design data is input. In general, MTO may mean transferring mask design data, for which an OPC modeling operation is completed, to request fabrication of a mask. Accordingly, MTO design data may be ultimately considered as mask design data for which an OPC modeling operation is completed. In an embodiment, such MTO design data may have a graphic data format which is used in electronic design automation (EDA) software and the like. For example, MTO design data may have a data format such as graphic data system II (GDS2) or open artwork system interchange standard (OASIS). However, embodiments of the present inventive concepts are not limited thereto.

In block S230, after the MTO design data is input, mask data preparation (MDP) is performed. In an embodiment, the MDP may include, for example, format conversion referred to as fracturing, augmentation of a barcode for mechanical reading, a standard mask pattern for testing, a job deck, etc., and automatic and manual verifications. However, embodiments of the present inventive concepts are not limited thereto. Here, the job deck may mean creating a text file for a series of commands such as arrangement information of multiple mask files, a reference dose, an exposure speed, or an exposure method.

The format conversion, that is, the fracturing, may denote a process of dividing the MTO design data according to regions and converting the format of the MTO design data into a format for an electron beam exposure apparatus. In an embodiment, the fracturing may include data manipulation such as scaling, data sizing, data rotation, pattern reflection, and color reversal. During a conversion process through the fracturing, data for numerous systematic errors, which may occur while the design data is transferred to an image on a wafer, may be corrected. The data correction process for the systematic errors may be referred to as a mask process correction (MPC) and may include, for example, an overlay adjustment referred to as an EP adjustment and an operation of increasing accuracy in the pattern arrangement. Accordingly, the fracturing may contribute to increasing mask quality and may be performed in advance to correct a mask process. Here, the systematic errors may be caused by distortions occurring in an exposure process, a mask development and etching process, a wafer imaging process, and the like.

The MDP may include the MPC. As described above, the MPC denotes a process of correcting an error occurring during an exposure process, that is, a systematic error. Here, the exposure process may include overall operations such as electron beam writing, development, etching, and baking. In addition, data processing may be performed before the exposure process. The data processing is a pre-processing for mask data and may include a grammar check of the mask data, prediction of an exposure time, and the like. However, embodiments of the present inventive concepts are not limited thereto.

In block S240, after the MDP, a substrate for a mask is exposed on the basis of the mask data. Here, the exposure may denote, for example, electron beam writing. The electron beam writing may be performed in a gray writing manner employing a multi-beam mask writer (MBMW). Also, the electron beam writing may be performed using a variable shape beam (VSB) exposure device.

Meanwhile, after the MDP operation and before the exposure process, a process of converting the mask data into pixel data may be performed. The pixel data is directly used in an actual exposure process and may include data on shapes which are to be exposed and data on a dose assigned to each of the shapes. Here, the data on shapes may be bitmap data converted from shape data, which is vector data, through rasterization and the like. However, embodiments of the present inventive concepts are not limited thereto.

In block S250, after the exposure process, a mask is fabricated through a series of processes. The series of processes may include, for example, a development process, an etching process, a cleaning process, and the like. Also, the series of processes for fabricating a mask may include a measurement process, a defect inspection process, or a defect repair process. In addition, the series of processes may include a pellicle coating process. However, embodiments of the present inventive concepts are not limited thereto. The pellicle coating process may denote a process of attaching a pellicle to protect the surface of the mask against subsequent contamination during delivery of the mask and an available lifespan of the mask when it is identified that there are no contamination particles or chemical spots on the mask through final cleaning and test processes.

The method of manufacturing a semiconductor device according to some embodiments of the present inventive concepts can increase a contrast value of an SEM image whose contrast quality is degraded because the resolution is not high enough for the critical dimension, pitch, etc. of a pattern to be exposed or due to various other reasons and can extract contour data while reducing white band information loss. Accordingly, accuracy in OPC modeling is increased such that a desired mask may be fabricated by the user.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present inventive concepts.

What is claimed is:

1. A method of manufacturing a semiconductor device, the method comprising:
providing a substrate having a pattern formed thereon;
generating a scanning electron microscope (SEM) image including a boundary image showing an edge of the pattern;
generating a blended image by performing at least one blending operation on the SEM image and a background image aligned with the boundary image; and
generating contour data by binarizing the blended image on a basis of a threshold value,
wherein the threshold value is determined by a critical dimension (CD) of the pattern,
the critical dimension is determined by measuring a distance between points corresponding to a threshold contrast value, and
the background image is generated by performing a Gaussian blur on a contour image, and the contour image is generated by binarizing a pre-background image.

2. The method of claim 1, wherein:
the boundary image includes a white band section having a contrast value that changes within the white band section;
the background image includes a slope section having a contrast value that changes within the slope section; and
the white band section and the slope section are aligned with each other to perform the at least one blending operation.

3. The method of claim 1, wherein the Gaussian blur is performed on the contour image before the at least one blending operation is performed.

4. The method of claim 1, further comprising:
generating a first blended image by performing a first blending operation on the SEM image and a first background image aligned with the boundary image;
generating a second blended image by performing a second blending operation on the SEM image and a second background image which is generated on a basis of the first blended image; and
generating the contour data by binarizing the second blended image on the basis of the threshold value.

5. The method of claim 1, further comprising:
generating an $N^{th}$ blended image by performing an $N^{th}$ blending operation on the SEM image and an $N^{th}$ background image that is generated on a basis of an $(N-1)^{th}$ blended image, wherein N is a predetermined natural number greater than or equal to 2; and
generating the contour data by binarizing the $N^{th}$ blended image on the basis of the threshold value.

6. The method of claim 1, further comprising:
generating a first blended image by performing a first blending operation on the SEM image and a first background image aligned with the boundary image;
comparing a first contrast slope at a first point in the boundary image and a second contrast slope at the first point in the first blended image; and
performing a second blending operation on the SEM image and a second background image that is generated on a basis of the first blended image if a difference between the first contrast slope at the first point in the boundary image and the second contrast slope at the first point in the first blended image is greater than a predetermined value.

7. The method of claim 1, wherein:
the pattern is a photoresist pattern; and
the SEM image is an after development inspection (ADI) image.

8. The method of claim 1, further comprising:
performing optical proximity correction (OPC) modeling on the basis of the contour data; and
generating a mask for the pattern on a basis of mask tape-out (MTO) design data which is generated through the OPC modeling.

9. The method of claim 1, wherein a noise filtering operation including Gaussian noise filtering and median kernel noise filtering is performed on the background image before the at least one blending operation is performed.

10. A method of manufacturing a semiconductor device, the method comprising:
providing a substrate having a pattern formed thereon;
generating a scanning electron microscope (SEM) image including a boundary image showing an edge of the pattern;
generating a blended image by performing at least one blending operation on the SEM image and a background image aligned with the boundary image, the generating of the blended image including:
generating a first blended image by performing a first blending operation on the SEM image and a first background image aligned with the boundary image;
generating a second blended image by performing a second blending operation on the SEM image and a second background image that is generated on a basis of the first blended image depending on whether a predetermined condition is satisfied; and
generating contour data by binarizing the blended image on a basis of a threshold value,
wherein the threshold value is determined by a critical dimension (CD) of the pattern,
the critical dimension is determined by measuring a distance between points corresponding to a threshold contrast value, and
the background image is generated by performing a Gaussian blur on a contour image, and the contour image is generated by binarizing a pre-background image.

11. The method of claim 10, further comprising:
generating an $N^{th}$ blended image by performing an $N^{th}$ blending operation on the SEM image and an $N^{th}$ background image that is generated on a basis of an $(N-1)^{th}$ blended image, wherein N is a predetermined natural number greater than or equal to 3; and
generating the contour data by binarizing the $N^{th}$ blended image.

12. The method of claim 10, further comprising:
comparing a first contrast slope at a first point in the boundary image and a second contrast slope at the first point in the first blended image to determine if the predetermined condition is satisfied; and
performing the second blending operation on the SEM image and the second background image that is generated on a basis of the first blended image if the predetermined condition is not satisfied.

13. The method of claim 10, wherein:
the contour data is generated by binarizing the second blended image on a basis of the threshold value.

14. The method of claim 10, wherein the Gaussian blur is performed on the first and second background images before the first and second blending operations are performed.

15. The method of claim 10, wherein:
the boundary image includes a white band section having a contrast value that changes within the white band section;
the first background image includes a slope section having a contrast value that changes within the slope section; and
the white band section and the slope section are aligned with each other to perform the first blending operation.

16. A pattern analysis system comprising:
an observing apparatus configured to generate a scanning electron microscope (SEM) image of a substrate having a pattern formed thereon, the SEM image includes a boundary image showing an edge of the pattern;
an image module configured to provide a background image aligned with the SEM image based on the boundary image, the background image being generated by performing a Gaussian blur on a contour image, and the contour image being generated by binarizing a pre-background image;
a blending module configured to receive the background image and the SEM image and generate a blended image by performing a blending operation on the background image and the SEM image; and
an edge placement (EP) gauge module configured to generate contour data by binarizing the blended image on a basis of a threshold value,
wherein the threshold value is determined by a critical dimension (CD) of the pattern, and
the critical dimension is determined by measuring a distance between points corresponding to a threshold contrast value.

17. The pattern analysis system of claim 16, wherein the image module performs the Gaussian blur on the contour image before providing the background image to the blending module.

18. The pattern analysis system of claim 17, wherein:
the boundary image includes a white band section having a contrast value that changes within the white band section;
the background image includes a slope section having a contrast value that changes within the slope section; and
the blending module aligns the white band section and the slope section with each other to perform the blending operation on the SEM image and the background image.

19. The pattern analysis system of claim 16, further comprising a CD gauge module configured to receive the SEM image, measure the CD of the pattern, and provide data on the CD to the EP gauge module.

* * * * *